United States Patent
Potvin et al.

(10) Patent No.: US 10,246,141 B2
(45) Date of Patent: Apr. 2, 2019

(54) VARIABLE-WIDTH AERODYNAMIC SPOILER ASSEMBLIES AND CONTROL LOGIC FOR MOTOR VEHICLES

(71) Applicant: GM GLOBAL TECHNOLOGY OPERATIONS LLC, Detroit, MI (US)

(72) Inventors: Caleb J. Potvin, Sterling Heights, MI (US); Jason D. Fahland, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/677,644

(22) Filed: Aug. 15, 2017

(65) Prior Publication Data
US 2019/0054962 A1    Feb. 21, 2019

(51) Int. Cl.
*B62D 35/00*  (2006.01)
*B62D 37/02*  (2006.01)

(52) U.S. Cl.
CPC ........... *B62D 35/007* (2013.01); *B62D 37/02* (2013.01)

(58) Field of Classification Search
CPC ............................ B62D 35/007; B62D 37/02
See application file for complete search history.

(56) References Cited

U.S. PATENT DOCUMENTS

| | | |
|---|---|---|
| 4,867,397 A | 9/1989 | Pamadi et al. |
| 5,280,990 A | 1/1994 | Rinard |
| 5,360,252 A | 11/1994 | Larsen |
| 5,908,217 A | 6/1999 | Englar |
| 6,283,407 B1 | 9/2001 | Hakenesch |
| 7,192,077 B1 | 3/2007 | Hilleman |
| 7,255,387 B2 | 8/2007 | Wood |
| 7,431,381 B2 | 10/2008 | Wood |
| 8,196,994 B2 | 6/2012 | Chen |
| 9,132,904 B2 | 9/2015 | Durham |
| 9,333,994 B1 | 5/2016 | Fahland et al. |
| 2009/0026797 A1 | 1/2009 | Wood |
| 2010/0181799 A1 | 7/2010 | Ryan et al. |
| 2011/0068604 A1 | 3/2011 | Neuberger et al. |
| 2011/0095564 A1 | 4/2011 | Chen |
| 2011/0095566 A1 | 4/2011 | Chen |
| 2011/0148140 A1 | 6/2011 | Benton |
| 2011/0175395 A1 | 7/2011 | Guigne et al. |

(Continued)

*Primary Examiner* — Lori L Lyjak
(74) *Attorney, Agent, or Firm* — Quinn IP Law (57) ABSTRACT

Disclosed are active variable-width aerodynamic spoiler assemblies, methods for making or for operating such active spoiler assemblies, and vehicles equipped with such active spoiler assemblies. A disclosed active spoiler assembly for modifying the aerodynamic performance of a motor vehicle includes a main body rigidly mounted to the vehicle body, extending transversely across the vehicle. The main body has an elongated construction with opposing longitudinal ends. First and second fins are each movably attached to a respective one of the opposing longitudinal ends of the main body. Also, first and second fin actuators are each attached to the vehicle body and attached to a respective one of the movable fins. The first fin actuator is selectively actuatable to independently move the first fin between respective retracted and extended positions, whereas the second fin actuator is selectively actuatable to independently move the second fin between respective retracted and extended positions.

20 Claims, 2 Drawing Sheets

(56) References Cited

U.S. PATENT DOCUMENTS

| | | |
|---|---|---|
| 2013/0062908 A1 | 3/2013 | Henderson et al. |
| 2013/0226414 A1* | 8/2013 | De Luca ................ B62D 37/02 701/49 |
| 2017/0088201 A1 | 3/2017 | Heil et al. |
| 2017/0158257 A1 | 6/2017 | Fahland et al. |
| 2017/0158259 A1 | 6/2017 | Fahland et al. |

* cited by examiner

FIG. 1

US 10,246,141 B2

VARIABLE-WIDTH AERODYNAMIC SPOILER ASSEMBLIES AND CONTROL LOGIC FOR MOTOR VEHICLES

INTRODUCTION

The present disclosure relates generally to features for improving the aerodynamic characteristics of motor vehicles. More specifically, aspects of this disclosure relate to active spoiler assemblies that are dynamically adjustable to modify the aerodynamic characteristics of motor vehicles.

Many current production motor vehicles, such as the modern-day automobile, are originally equipped with or retrofit to employ stock body hardware and aftermarket accessories engineered to improve the aerodynamic performance of the vehicle. Front air dams and splitters, for example, modify the flow of air passing under the vehicle body to balance the distribution of fore and aft downforce. As the name implies, an air dam is a fluid barrier structure; in this case, one that is mounted underneath or integrated with the front-end bumper structure of the vehicle body, extending downward into proximity with the roadway. Air dams—or more colloquially "front spoilers"—enhance vehicle stability and aerodynamics by blocking and redirecting turbulent air flowing under the chassis. Splitters, on the other hand, are constructed as a flat extension to the very bottom of the front bumper, extending forward from the vehicle and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics of the front end of a vehicle, spoilers and diffusers operate to modify aerodynamic flow at the rear end of a vehicle. An air spoiler, which is normally anchored on top of the trunk lid or rear roof rail, is shaped similar in geometry to an inverted airfoil to modify airflow and generate an aerodynamic pressure gradient that produces downforce on the rear tires. A rear diffuser, on the other hand, is a series of specially formed channels on the aft part of the vehicle underbody that improves aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

For some high-performance automotive applications, the vehicle is stock equipped with an active aerodynamic element that is operable to be reoriented or repositioned while the automobile is in motion to adjust the aerodynamic properties of the vehicle. One such "active aero" device is the deployable rear spoiler that is operable to be dynamically retracted and extended based on vehicle operating conditions. At lower vehicle speeds, for instance, the spoiler is retracted to a stowed position, seated generally flush against the rear of the vehicle, to reduce fluid drag forces. When the vehicle reaches higher speeds—around 50 to 60 mph—the spoiler is automatically deployed to an extended position, displaced away or projecting angularly from the rear of the vehicle, to reduce the effects of turbulent air flow and to generate downforce for improved vehicle stability and handling. Another available active aero device is the rotatable rear wing which has a dynamically adjustable pitch angle to control drag and downforce at various speeds and, for some architectures, provide air-braking capabilities.

SUMMARY

Disclosed herein are actively controlled variable-width spoiler assemblies and related control logic for improving vehicle aerodynamics performance, methods for making and methods for operating such active spoiler assemblies, and motor vehicles equipped with active variable-width, aero vectoring spoiler assemblies. By way of example, there is presented a vehicle controlled rear spoiler assembly with adjustable fin ends that are discretely extendable and retractable to vary the width of the spoiler assembly. These opposing fin ends are simultaneously extendable to enable a maximum spoiler width for increased surface area and, thus, increased overall downforce. When desired, the starboard end (or port end) of the spoiler is independently extendable to bias downforce to the right side (or left side) of the vehicle for increased stability and side-to-side balance, e.g., during a turn or other maneuver. The respective positions of the spoiler's two fin ends may be continuously adjusted throughout a maneuvering event to constantly modulate this downforce bias for further improvements in handling and vehicle stability. As used herein, the term "spoiler" may refer to any logically relevant spoiler construction, including wing-type "pedestal" spoilers, lip spoilers, duck-tail and whale-tail spoilers, front, rear, roof and tailgate mounted spoilers, etc.

Attendant benefits for at least some of the disclosed concepts include active aero spoiler assemblies with dynamically variable widths that enable selectively increasing and decreasing overall downforce and, when desired, applying an optional side-to-side downforce bias. Disclosed active aero spoiler architectures also enable continuously varying the spoiler's width to selectively apply even and uneven distributions of downforce across the rear of the vehicle for improved handling during complex vehicle maneuvers. Disclosed active aero assemblies help to enhance vehicle stability and increase side-to-side balance, thus reducing dependence on electronic stability control (ESC) systems. Other attendant benefits for disclosed active aero spoilers include reducing drag and wind noise, while ameliorating undesired lift forces, turbulent fluid flow and other causes of aerodynamic instability at high vehicle speeds.

Aspects of the present disclosure are directed to spoiler assemblies with vehicle-controlled variable widths for mitigating aerodynamic drag and lift on a motor vehicle. Disclosed, for example, is an active spoiler assembly for modifying the aerodynamic performance of a motor vehicle. This active spoiler assembly includes a main body that rigidly mounts, either directly or indirectly, to the vehicle body, extending transversely across the motor vehicle. The spoiler assembly's main body has an elongated inverted-airfoil construction with opposing longitudinal ends. First and second spoiler fins each movably attach to a respective one of the opposing longitudinal ends of the main body. The active spoiler assembly also includes a pair of fin actuators attached, either directly or indirectly, to the vehicle body. Each fin actuator is operatively attached to a respective one of the movable spoiler fins. The first fin actuator is selectively actuable, e.g., via an onboard vehicle controller, program module, or logic circuit, to independently move the first fin between respective retracted and extended positions. The second fin actuator is also selectively actuable, e.g., as previously indicated, to independently move the second fin between respective retracted and extended positions.

Other aspects of the present disclosure are directed to motor vehicles equipped with active variable-width, aero vectoring spoiler assemblies. As used herein, the term "motor vehicle" may include any relevant vehicle platform, such as passenger vehicles (combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with opposing front and rear ends, and an active spoiler assembly located proximate the rear end of the vehicle body (e.g., mounted to a trunk lid, tailgate, liftgate, or roof rail aft of the vehicle's passenger compartment). For instance, the active spoiler assembly may have a pedestal spoiler configuration with a stanchion assembly securely mounting the variable-width spoiler at the rear end of the vehicle, or a lip spoiler configuration with mounting hardware securely mounting the variable-width spoiler at the rear end of the vehicle.

Continuing with the above example, the active spoiler assembly includes a main body that rigidly mounts, either directly or indirectly, to the vehicle body, extending transversely across the rear end of the motor vehicle. The spoiler's main body has an elongated wing-shaped construction with opposing longitudinal ends. A respective spoiler fin is movably attached to each longitudinal end of the spoiler's main body. Electronically controlled fin actuators, which are mounted within the spoiler's main body or to a segment of the vehicle body, each operatively attaches to a respective one of the movable fins. A vehicle controller, which is communicatively connected to the fin actuators, is programmed to transmit command signals to each fin actuator to independently move their respective fin along a discrete rectilinear path between respective retracted and extended positions. In so doing, the active spoiler assembly is operable to selectively increase and decrease downforce on the motor vehicle and, when desired, apply a side-to-side downforce bias on the vehicle.

Additional aspects of the present disclosure are directed to methods for making and methods for using actively controlled variable-width spoiler assemblies. Disclosed, for example, is a method of assembling an active spoiler assembly for modifying aerodynamic performance of a motor vehicle. The method includes, in any order and in any combination with any features presented in this disclosure: rigidly mounting a main body of the active spoiler assembly to the vehicle body such that the main body extends transversely across the motor vehicle, the main body having an elongated construction with opposing first and second longitudinal ends; movably attaching first and second fins of the active spoiler assembly to the first and second longitudinal ends of the main body, respectively; and attaching first and second fin actuators of the active spoiler assembly to the vehicle body and to the first and second fins, respectively. The first fin actuator is configured to selectively move the first fin between respective first retracted and extended positions, and the second fin actuator is configured to selectively move the second fin between respective second retracted and extended positions.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings, and will herein be described in detail, representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., are with respect to a motor vehicle, such as a forward driving direction of a motor vehicle when the vehicle is operatively oriented on a normal driving surface, for example.

Figure 1:
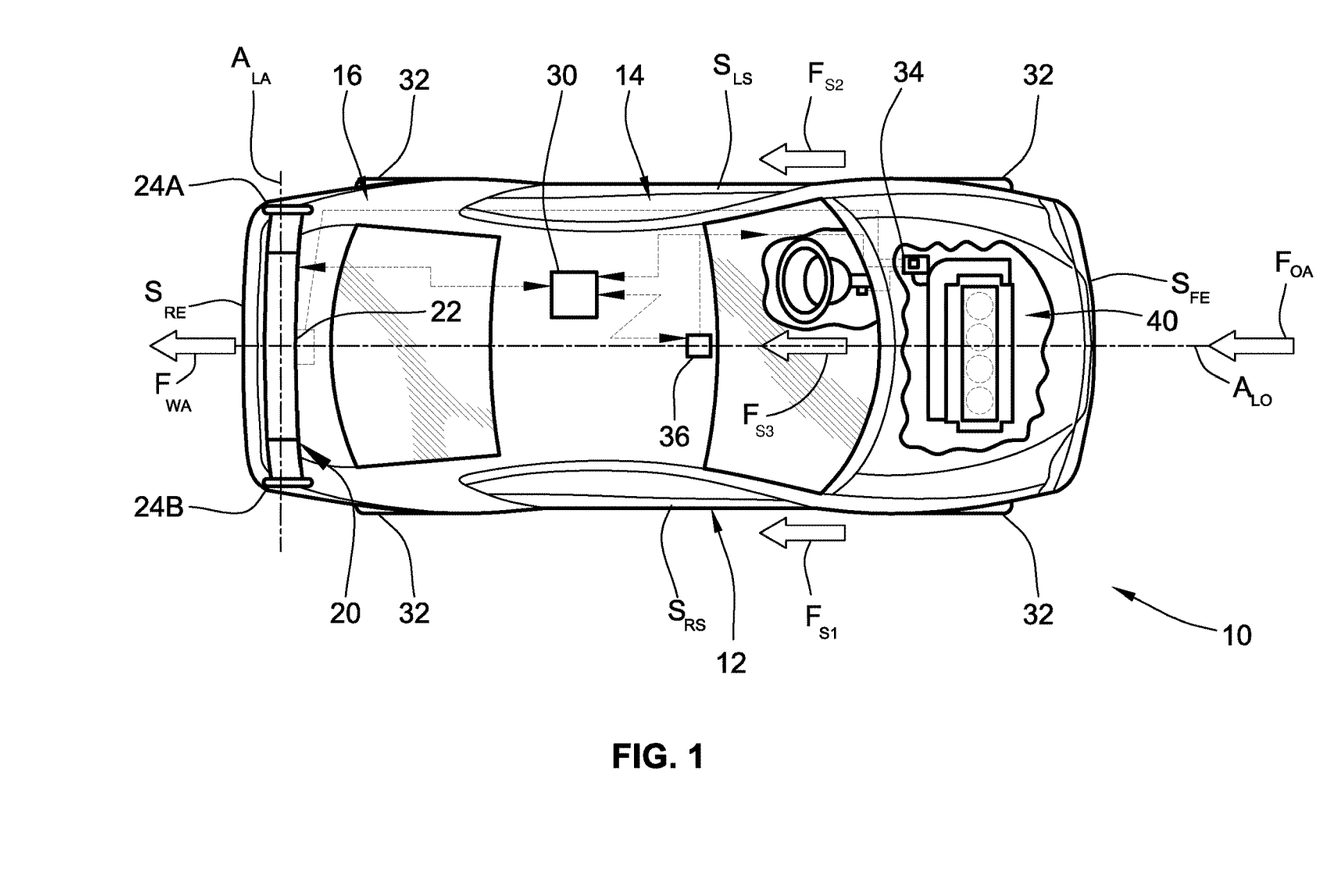
FIG. 1 is a partially schematic plan-view illustration of a representative motor vehicle equipped with an example of an actively controlled variable-width spoiler assembly in accordance with aspects of the present disclosure.

Referring now to the drawings, wherein like reference numbers refer to like features throughout the several views, there is shown in FIG. 1 a partially schematic illustration of a representative automobile, which is designated generally at 10 and portrayed herein for purposes of discussion as a two-seat coupe-style passenger vehicle. Mounted to the body 12 of the automobile 10, e.g., aft of a passenger compartment 14 and above a rear cargo compartment 16 (also referred to herein as "trunk"), is an actively controlled ("active") variable-width spoiler assembly 20 for improving aerodynamic performance of the vehicle 10. The illustrated automobile 10—also referred to herein as "motor vehicle" or "vehicle" for short—is merely an exemplary application with which novel aspects and features of this disclosure may be practiced. In the same vein, implementation of the present concepts into a rear pedestal or lip-type spoiler assembly should also be appreciated as a representative application of the novel features disclosed herein. As such, it will be understood that aspects and features of this disclosure may be incorporated into other spoiler configurations, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

As shown in FIG. 1, the vehicle body 12 defines four body sides: a body front side or front end $S_{FE}$, a body rear side or rear end $S_{RE}$ opposite the front end $S_{FE}$, a lateral port side or left side $S_{LS}$, and a lateral starboard side or right side $S_{RS}$ opposite the left side $S_{LS}$. The left (port) side $S_{LS}$ and right (starboard) side $S_{RS}$ are generally parallel to one another and with respect to a longitudinal axis $A_{LO}$ of the vehicle 10, and span the distance between the vehicle's front and rear ends $S_{FE}$, $S_{RE}$ During normal vehicle operation, the front end $S_{FE}$ is oriented to face oncoming ambient airflow $F_{OA}$ when the vehicle 10 is in forward motion relative to the road surface. As the vehicle 10 moves across the road surface, the ambient airflow $F_{OA}$ passes around the vehicle body 12 and splits into various airflow portions, represented in FIG. 1 with first airflow portion $F_{S1}$ passing around the starboard side $S_{RS}$ of the vehicle 10, second airflow portion $F_{S2}$ passing around the vehicle's port side $S_{LS}$, and third airflow portion $F_{S3}$ passing over the top of the vehicle 10. A fourth airflow portion (not visible in the view provided) passes underneath the vehicle 10 along the undercarriage thereof. These airflow segments $F_{S1}$, $F_{S2}$ and $F_{S3}$ eventually rejoin in a wake area or recirculating airflow region $F_{WA}$ immediately behind the vehicle's rear end $S_{RE}$.

Automobile 10 is retrofit or stock equipped with one or more active aero devices, an example of which is shown in FIG. 1 as an active spoiler assembly 20 with a selectively variable width. The selective expansion and contraction of the active spoiler assembly 20 relative to a transverse vehicle axis $A_{LA}$ is automated via a vehicle controller 30, which may be resident to or remote from the body 12 of the vehicle 10. As described in detail below, this active spoiler assembly 20 includes a wing-shaped main body 22 terminating at opposing ends thereof with fin ends (or "fins") 24A and 24B that are movable along a laterally oriented spoiler axis $A_{LA}$. As used herein, the term "wing-shaped" may be defined as a structure having an airfoil shape that produces an aerodynamic force, such as lift or downforce, during propulsion through a fluid. The spoiler's main body 22 and fins 24A, 24B cooperatively regulate the movement of ambient airflow along the longitudinal axis $A_{LO}$ of the vehicle body 12 aft of the passenger compartment 14. The wing-shaped body 22 and fins 24A, 24B may be formed from a suitably rigid but low mass material, such as an engineered plastic, fiber-reinforced glass composite, or aluminum, e.g., for structural stability and resiliency. The first fin 24A is mounted proximate a first longitudinal end of the main body 22, positioned along the port side $S_{LS}$ of the vehicle 10. Conversely, the second fin 24B is mounted proximate a second longitudinal end of the main body 22, positioned along the vehicle's starboard side $S_{RS}$. Capping the distal end of each fin 24A, 24B is a polyhedral plate that is generally perpendicular to the road surface, aligned on a respective fin axis that is substantially parallel to the longitudinal body axis $A_{LO}$. Accordingly, the spoiler fins 24A, 24B also help to control movement of ambient airflow perpendicular to the longitudinal axis $A_{LO}$ of the body 12.

As indicated above, electronic vehicle controller 30 is constructed and programmed to govern the expansion and contraction of the spoiler assembly 20 width to selectively modify the aerodynamic characteristics of the motor vehicle 10. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit (s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event.

With continuing reference to FIG. 1, the vehicle 10 employs one or more prime movers, such as internal combustion engine (ICE) assembly 40, to transmit tractive power to multiple road wheels 32. An array of wheel sensors 34 may be arranged at various locations throughout the vehicle body 12 to detect respective rotating speeds for each of the road wheels 32, and communicate signals indicative thereof to the vehicle controller 30. Once received, the vehicle controller 30 may be programmed to process, analyze and store sensor data, including correlating wheel speed data of sensor(s) 34 to road speed of the vehicle 10. The vehicle 10 is equipped with one or more vehicle dynamics sensors 36, each of which may be in the nature of a single-axis or a triple-axis accelerometer, an angular rate sensor, an inclinometer, etc., for detecting yaw, pitch, roll, forward acceleration/deceleration, lateral acceleration/deceleration or any other dynamics related information of the vehicle 10 relative to the road surface, and communicate signals indicative thereof to the controller 30. It is envisioned that the vehicle may utilize additional or alternative sensors, packaged at similar or alternative locations, to that which are shown in the drawings to execute any of the disclosed operations. In FIG. 1, the dashed arrows interconnecting the various illustrated components are emblematic of electronic signals or other communication exchanges by which data and/or control commands are transmitted, wired or wirelessly, from one component to the other.

Figure 2:
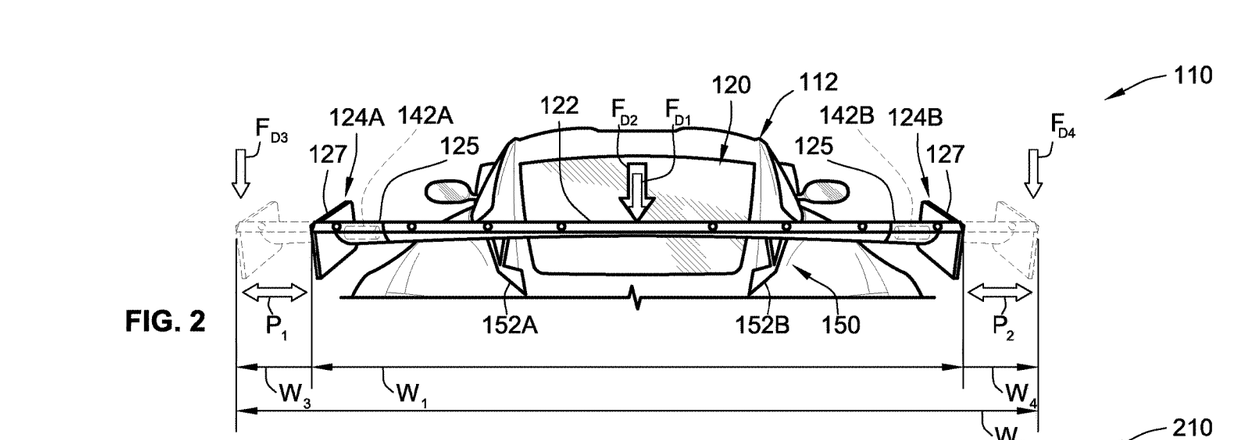
FIG. 2 is a rear-view illustration of another representative motor vehicle equipped with an example of an actively controlled variable-width rear pedestal spoiler assembly in accord with aspects of the disclosed concepts.
Figure 3:
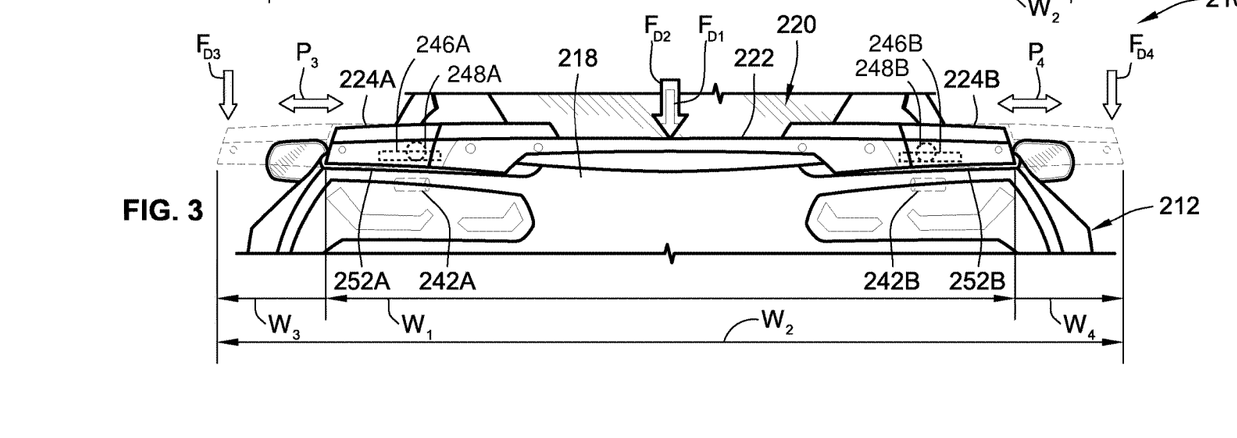
FIG. 3 is a rear-view illustration of yet another representative motor vehicle equipped with an example of a variable-width rear lip spoiler assembly in accord with aspects of the disclosed concepts.

Turning next to FIGS. 2 and 3, there are shown other representative motor vehicles 110 and 210, respectively, that are equipped with actively controlled variable-width rear spoiler assemblies 120, 220. While differing in appearance, it is envisioned that any of the features disclosed with reference to the examples of FIGS. 2 and 3 can be incorporated, singly or in any combination, into the example of FIG. 1, and vice versa. As shown, each active spoiler assembly 120, 220 includes a respective main body 122 and 222 that rigidly mounts to the vehicle's body 112, 212 and extends transversely across the rear end of the automobile 110, 210. The spoiler assemblies' main body 122, 222 has an airfoil shape or other aerodynamic design with an elongated construction that terminates at opposing longitudinal ends that are situated proximate port and starboard sides of the vehicle 110, 210. In FIG. 2, the spoiler assembly 120 is a pedestal or "wing" type spoiler architecture, e.g., employing a stanchion assembly 150 for mounting the main body 122 to the vehicle 110. The stanchion assembly 150 of FIG. 2 is composed of two laterally spaced, upright mounting frames 152A and 152B rigidly attached along an upper end thereof (e.g., via brackets, screws and nuts) to the main body 122, and rigidly mounted along a lower end thereof (e.g., via gaskets, bolts, and clips) to the rear deck of the vehicle body 112. Conversely, the spoiler assembly 220 of FIG. 2 is a "lip" type spoiler employing a pair of mounting hardware sets 252A and 252B composed, e.g., of mounting brackets, sealant pads, and bolts, to rigidly mount the main body 222 directly to the trunk lid 218.

According to the representative architecture portrayed in FIG. 2, the variable-width rear spoiler assembly 120 is constructed with a pair of spoiler fins 124A and 124B, each of which is movably attached to a respective longitudinal end of the main body 122. As shown, these first and second fins 124A, 124B are each composed of an elliptical-cylinder-shaped sleeve ("outer sleeve") 125 with a polyhedral plate 127 secured to an outboard end thereof. Outer sleeve 125 of each fin 124A, 124B is telescopingly received on and generally circumscribes a complementary elliptical-cylinder-shaped inner sleeve (not visible in FIG. 2) that projects outboard from the corresponding longitudinal end of the main body 122. With this configuration, the fins 124A, 124B slide, e.g., to the left and right in FIG. 2, between respective retracted and extended positions. In particular, the first fin 124A moves along a first rectilinear path (represented by arrow $P_1$) between a first retracted position (shown with solid lines in FIG. 2) and a first extended position (shown with hidden lines in FIG. 2). In the same vein, the second fin 124B moves along a second rectilinear path (represented by arrow $P_2$) between a second retracted position (shown with solid lines in FIG. 2) and a second extended position (shown with hidden lines in FIG. 2). For at least some applications, the fins' rectilinear paths $P_1$ and $P_2$ are generally coaxial another and both generally orthogonal to the vehicle's longitudinal axis $A_{LO}$ (FIG. 1). Optional designs may employ fin paths that are obliquely angled to one another. Moreover, the fins may follow arcuate and other non-linear paths.

With regard to the representative architecture portrayed in FIG. 3, the variable-width rear spoiler assembly 220 is constructed with a pair of spoiler fins 224A and 224B, each of which is movably attached to a respective longitudinal end of the spoiler's main body 222. As shown, these first and second fins 224A, 224B are each composed of an elongated polygonal blade 225 that is slide-mounted on, e.g., via a ball-bearing telescoping slide rail assembly, and seated flush against a complementary polygonal mounting plate (not visible in FIG. 3) that projects from the corresponding longitudinal end of the main body 222. With this configuration, the fins 224A, 224B slide, e.g., to the left and right in FIG. 3, between respective retracted and extended positions. By way of non-limiting example, the first fin 224A moves along a first rectilinear path (represented by arrow $P_3$) between a first retracted position (shown with solid lines in FIG. 3) and a first extended position (shown with hidden lines in FIG. 3). In the same vein, the second fin 224B moves along a second rectilinear path (represented by arrow $P_4$) between a second retracted position (shown with solid lines in FIG. 3) and a second extended position (shown with hidden lines in FIG. 3). Similar to the assembly 120 of FIG. 2, the paths $P_3$, $P_4$ of movable spoiler fins 224A, 224B are generally orthogonal to the longitudinal axis $A_{LO}$ (FIG. 1) of the vehicle 210. It is within the scope of this disclosure to use greater or fewer actuators, located at similar or distinct locations, than what is shown in the drawings.

Active spoiler assemblies 120, 220 of FIGS. 2 and 3 each have dynamically modifiable widths that are governed by an electronic control unit, such as vehicle controller 30 of FIG. 1, to thereby selectively increase and decrease a downforce on the rear of the vehicle 110, 210 and, when desired, apply a left-side downforce bias and a right-side downforce bias. For instance, the spoiler assemblies 120, 220 are each equipped with a set of fin actuators—fin actuators 142A and 142B of FIG. 2 and fin actuators 242A and 242B of FIG. 3—that regulate inboard and outboard movement of the spoiler fins 124A, 124B, 224A, 224B. As shown, the first fin actuator 142A of FIG. 2 is mounted inside the port side of the spoiler assembly's main body 122 and operatively attached (e.g., via a control arm and spring damper) to the first fin 124A, whereas the second fin actuator 142B is mounted inside the starboard side of the spoiler assembly's main body 122 and operatively attached (e.g., via a discrete control arm and spring damper) to the second fin 124B. By comparison, the first fin actuator 242A of FIG. 3 is mounted to the underside of the trunk lid 218 and operatively attached (e.g., via a control arm and spring damper) to the first fin 224A, whereas the second fin actuator 242B is mounted to a discrete section of the underside of the trunk lid 218 and operatively attached (e.g., via a control arm and spring damper) to the second fin 224A. While it is envisioned that the actuators may be mounted at almost any location within the vehicle 210, the first and second fin actuators 224A, 224B of FIG. 3 are both shown mounted directly underneath the main body 222.

The illustrated fin actuators 142A, 142B, 242A, 242B can take on many available configurations, including electric actuators (linear and rotary; DC, AC, and stepper), hydraulic actuators (single-acting and dual-acting), pneumatic actuators (ram and diaphragm), or any combination thereof. In the case of hydraulic and pneumatic actuators, a small piston or bladder operates to push and pull each fin. A power source, such as a 12V DC electric motor, and a source of fluid/air, such as an oil reservoir or air compressor, can be packaged at locations similar to or discrete from the actuator itself. In pedestal configurations, for example, fluid conduits and electrical connectors can be routed through one or more of the stanchions such that the bulk of the actuator assembly is stored within the trunk compartment. In the case of a lip spoiler, the actuator device may located directly below the spoiler assembly, inside the trunk compartment; however, if packaging constraints dictate otherwise, the actuators can be stored within a lamp well or within a C or D-pillar. A pneumatic, electric, or electro-pneumatic actuator design may be preferable to balance mass and speed with precision, with the ability to easily and quickly change or repair hardware without hydraulic fluid spills. Each spoiler fin, such as spoiler fins 224A and 224B of FIG. 3, may be mounted on a flat, linear gear rack, such as gear racks 246A and 246B, via a rotating pinion gear, such as gears 248A and 248B, that is attached, e.g., to a hidden side of the fin. As shown, each linear gear rack 246A, 246B is mounted proximate a respective longitudinal end of the main body 220. Each gear 248A, 248B, in turn, is rotatably attached to a respective one of the fins 224A, 224B. These gears 248A, 248B are meshingly engaged with the racks 246A, 246B to movably attach the fins 224A, 224B to the main body 220. A pinion gear element may have sensors to record actual position, as well as a braking device to provide fine control by slowing/braking/holding the movable fin at a particular tooth count for optimal accuracy and control.

With continuing reference to FIGS. 2 and 3, each fin actuator 142A, 142B, 242A, 242B is controlled by an onboard or remote electronic control unit (e.g., controller 30 of FIG. 1) to selectively move a corresponding spoiler fin 124A, 124B, 224A, 224B between respective retracted and extended positions. For instance, in FIG. 2, both fins 124A, 124B may be simultaneously deployed to their fully extended positions to increase the spoiler assembly's total width from a first "fully retracted" width $W_1$ to a second "fully expanded" width $W_2$. In so doing, a downforce on the rear of the vehicle is increased from a first "base" downforce FM to a second "max" downforce $F_{D2}$. Optionally, the first fin actuator 142A may be modulated to move the first fin 124A independent of the second fin 124B, while the second fin 124B is held in a retracted state, such that the spoiler assembly's width is increased from the "fully retracted" width $W_1$ to a third "partially expanded" width $W_3$. When operating in this state, the active spoiler assembly 120 increases the downforce on the rear of the vehicle 110 while concomitantly applying a port-side-biased downforce $F_{D3}$ on the driver-side rear tire. On the other hand, the second fin actuator 142B may be modulated to move the second fin 124B independent of the first fin 124A, while the first fin 124A is still retracted, such that the spoiler assembly's width is increased from the "fully retracted" width $W_1$ to a fourth "partially expanded" width $W_4$. When operating in this particular state, the active spoiler assembly 120 increases the downforce on the rear of the vehicle 110 while concomitantly applying a starboard-side-biased downforce $F_{D4}$ on the passenger-side rear tire. For at least some optional applications, each fin actuator 142A, 142B is selectively actuable to locate the respective fin 124A, 124B at any of multiple positions between its fully retracted and fully extended positions. The active spoiler assembly 220 of FIG. 3 may be similarly configured to operate in the manner previously described with respect to the spoiler assembly of FIG. 2; for purposes of efficiency and succinctness, a redundant description thereof will not be repeated.

The active aero spoiler architectures 120, 220 of FIGS. 2 and 3 enable the vehicle 110, 210 to continuously vary each spoiler's total width and thereby selectively apply even and uneven distributions of downforce across the rear of the vehicle 110, 210 for improved handling, e.g., during complex vehicle maneuvers. Vehicle controller 30, for example, may be programmed to individually vary the positions of each spoiler fin 124A, 124B, 224A, 224B relative to the main body 122, 222 during a cornering maneuver of the vehicle 110, 210 in response to changes of lateral acceleration, yaw, and wheel slippage as detected by one or more of the onboard vehicle sensors 34, 36 to thereby repeatedly vary aerodynamic downforce on the vehicle body 112, 212 during a cornering maneuver. During a limited handling cornering maneuver, inertial mass is generally transferred to the side of the vehicle on the outside of the corner (e.g., a right-hand vehicle turn results in loads being transferred leftward). As such, the outside tires may benefit more than the inside tires from increased downforce provided by the active aero spoiler system. The active spoiler assemblies 120, 220 of FIGS. 2 and 3 provide a mechanism for achieving increased downforce targets on select tires without unnecessarily adding drag. During a right-hand turn maneuver, for example, both fins 124A, 124B may be simultaneously deployed to their fully extended positions immediately prior to and at the initial onset of the turn; this will maximize downforce on the rear of the vehicle. As the vehicle 110 approaches the corner, the spoiler assembly 120 may retract just the right-hand side (inside) fin 124B to help apply a downforce bias on the outside tires. When the vehicle passes the corner, and begins to exit the turn, the outside fin 124A may be similarly retracted (e.g., if no tractive effort issues exist) or re-deployed to a fully extended position (e.g., if a tractive effort issue exists, and rear tire assistance is desired). Both fins 124A, 124B are then retracted immediately prior to and at the completion of the turn.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An active spoiler assembly for modifying aerodynamic performance of a motor vehicle, the motor vehicle including a vehicle body with opposing front and rear ends, the active spoiler assembly comprising:
    a main body configured to rigidly mount to the vehicle body and extend transversely across the motor vehicle, the main body having an elongated construction with opposing first and second longitudinal ends;
    first and second fins each movably attached to a respective one of the first and second longitudinal ends of the main body; and
    first and second fin actuators configured to attach to the vehicle body and each attached to a respective one of the first and second fins,
    wherein the first fin actuator is configured to selectively move the first fin between respective first retracted and extended positions, and
    wherein the second fin actuator is configured to selectively move the second fin between respective second retracted and extended positions.

2. The active spoiler assembly of claim 1, wherein the first fin actuator is configured to move the first fin independent of the second fin, and the second fin actuator is configured to move the second fin independent of the first fin.

3. The active spoiler assembly of claim 1, wherein the first fin actuator selectively moves the first fin along a first rectilinear path between the first retracted and extended positions, and the second fin actuator selectively moves the second fin along a second rectilinear path between the second retracted and extended positions.

4. The active spoiler assembly of claim 1, wherein the first fin actuator is configured to locate the first fin at multiple positions between the first retracted and extended positions, and the second fin actuator is configured to locate the second fin at multiple positions between the second retracted and extended positions.

5. The active spoiler assembly of claim 1, wherein the first fin is telescopingly attached to the first longitudinal end of the main body to slide between the first retracted and extended positions, and the second fin is telescopingly attached to the second longitudinal end of the main body to slide between the second retracted and extended positions.

6. The active spoiler assembly of claim 1, wherein the first and second fin actuators each includes a pneumatic actuator, an electric linear actuator, or an electro-pneumatic actuator.

7. The active spoiler assembly of claim 1, further comprising:
   first and second linear gear racks each attached proximate a respective one of the first and second longitudinal ends of the main body; and
   first and second gears each rotatably attached to a respective one of the first and second fins, the first and second gears meshingly engaging with the first and second gear racks, respectively, to thereby movably attach the first and second fins to the main body.

8. The active spoiler assembly of claim 1, further comprising:
   a vehicle controller communicatively connected to the first and second fin actuators and operable to regulate movement of the first and second fins; and
   a vehicle dynamics sensor communicatively connected to the vehicle controller and configured to detect lateral acceleration of the motor vehicle,
   wherein the vehicle controller is programmed to individually vary the positions of the first and second fins relative to the main body during a cornering maneuver of the vehicle in response to changes of the lateral acceleration detected by the vehicle dynamics sensor to thereby repeatedly vary aerodynamic downforce on the vehicle body during the cornering maneuver.

9. The active spoiler assembly of claim 1, further comprising a stanchion assembly attached to the main body and configured to rigidly mount proximate the rear end of the vehicle body.

10. The active spoiler assembly of claim 1, wherein the first and second fin actuators are mounted inside the main body.

11. The active spoiler assembly of claim 1, wherein the motor vehicle further includes a trunk lid mounted proximate the rear end of the vehicle body, the active spoiler assembly further comprising mounting hardware configured to rigidly mount the main body to the trunk lid.

12. The active spoiler assembly of claim 1, wherein the motor vehicle further includes a trunk lid mounted proximate the rear end of the vehicle body, and wherein the first and second fin actuators are configured to mount to the trunk lid underneath the main body.

13. A motor vehicle comprising:
   a vehicle body with opposing front and rear ends;
   an active spoiler assembly located proximate the rear end of the vehicle body, the active spoiler assembly including:
      a main body rigidly mounted to the vehicle body, extending transversely across the rear end of the motor vehicle, the main body having an elongated construction with opposing first and second longitudinal ends;
      first and second fins each movably attached to a respective one of the first and second longitudinal ends of the main body; and
      first and second fin actuators mounted to the main body or the vehicle body and each attached to a respective one of the first and second fins; and
   a vehicle controller communicatively connected to the first and second fin actuators, the vehicle controller being programmed to:
      direct the first fin actuator to independently move the first fin along a first rectilinear path between respective first retracted and extended positions, and
      direct the second fin actuator to independently move the second fin along a second rectilinear path between respective second retracted and extended positions.

14. A method of assembling an active spoiler assembly for modifying aerodynamic performance of a motor vehicle, the motor vehicle including a vehicle body with opposing front and rear ends, the method comprising:
   rigidly mounting a main body of the active spoiler assembly to the vehicle body such that the main body extends transversely across the motor vehicle, the main body having an elongated construction with opposing first and second longitudinal ends;
   movably attaching first and second fins of the active spoiler assembly to the first and second longitudinal ends of the main body, respectively; and
   attaching first and second fin actuators of the active spoiler assembly to the vehicle body and to the first and second fins, respectively,
   wherein the first fin actuator is configured to selectively move the first fin between respective first retracted and extended positions, and
   wherein the second fin actuator is configured to selectively move the second fin between respective second retracted and extended positions.

15. The method of claim 14, wherein the first fin actuator is configured to move the first fin independent of the second fin, and the second fin actuator is configured to move the second fin independent of the first fin.

16. The method of claim 14, wherein the first fin actuator selectively moves the first fin along a first rectilinear path between the first retracted and extended positions, and the second fin actuator selectively moves the second fin along a second rectilinear path, distinct from the first rectilinear path, between the second retracted and extended positions.

17. The method of claim 14, wherein the first fin actuator is configured to locate the first fin at multiple positions between the first retracted and extended positions, and the second fin actuator is configured to locate the second fin at multiple positions between the second retracted and extended positions.

18. The method of claim 14, wherein movably attaching the fins includes telescopingly attaching the first fin to the first longitudinal end of the main body to slide between the first retracted and extended positions, and telescopingly attaching the second fin to the second longitudinal end of the main body to slide between the second retracted and extended positions.

19. The method of claim 14, wherein rigidly mounting the main body includes rigidly mounting a stanchion assembly proximate the rear end of the vehicle body, and rigidly mounting the main body to the stanchion assembly.

20. The method of claim 14, wherein attaching the fin actuators to the vehicle body includes mounting the first and second fin actuators inside the main body of the active spoiler assembly or mounting the first and second fin actuators to a trunk lid underneath the main body.

\* \* \* \* \*